(12) United States Patent
Nicolas (10) Patent No.: US 6,557,741 B2
(45) Date of Patent: May 6, 2003

(54) STORAGE CARRIAGE AND METHOD OF STORING A LONGITUDINAL COMPONENT IN THE STORAGE CARRIAGE

(75) Inventor: Bernard Robert Nicolas, Bonnert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/740,377

(22) Filed: Dec. 19, 2000

(65) Prior Publication Data

US 2002/0074378 A1 Jun. 20, 2002

(51) Int. Cl.⁷ .......................... B65H 20/34; B65H 20/24
(52) U.S. Cl. ................ 226/118.2; 226/104; 226/113; 226/118.5; 226/172
(58) Field of Search ................. 226/172, 104, 226/118.2, 118.5, 113

(56) References Cited

U.S. PATENT DOCUMENTS

| | | | |
|---|---|---|---|
| 2,001,345 A | 5/1935 | Forty | 34/649 |
| 2,291,807 A * | 8/1942 | Hart, Jr. | 226/172 X |
| 2,690,628 A * | 10/1954 | Courtney et al. | 226/172 X |
| 2,987,199 A | 6/1961 | Zawaski | 198/347.1 |
| 3,609,805 A * | 10/1971 | Fritsch | 226/172 X |
| 3,810,569 A | 5/1974 | Fulk | 226/109 |
| 4,253,376 A | 3/1981 | Washburn et al. | 89/33.14 |
| 4,960,211 A | 10/1990 | Bailey | 211/60.1 |
| 5,400,621 A | 3/1995 | Smejda | 68/5 C |
| 5,494,205 A | 2/1996 | Nielsen et al. | 226/104 |
| 5,579,930 A | 12/1996 | Brendle | 211/151 |
| 5,735,380 A | 4/1998 | Schneider et al. | 198/347.1 |
| 5,769,302 A | 6/1998 | Richert et al. | 226/118.1 |
| 5,845,758 A | 12/1998 | Bryant et al. | 198/347.3 |
| 6,152,345 A * | 11/2000 | Griffin et al. | 226/172 |

FOREIGN PATENT DOCUMENTS

JP 05278912 A * 10/1993 ............. 226/172 X

* cited by examiner

Primary Examiner—Kathy Matecki
Assistant Examiner—Minh-Chau Pham
(74) Attorney, Agent, or Firm—Nancy T. Krawczyk (57) ABSTRACT

A storage carriage for longitudinal components. The storage carriage has a pair of continuous belts. The belts are arranged to form a nested zigzag pattern. As the component is feed through the nested zigzag pattern, substantially the entire length of the component within the storage carriage is subjected to the same tension and compression. The component is fed into one corner of the carriage and is removed from the opposing corner of the carriage. The component travels through the carriage in a "first-in/first-out" system.

10 Claims, 9 Drawing Sheets

STORAGE CARRIAGE AND METHOD OF STORING A LONGITUDINAL COMPONENT IN THE STORAGE CARRIAGE

FIELD OF THE INVENTION

The present invention is directed towards a storage carriage. More particularly, the present invention is a carriage for storage and transportation of a longitudinal component.

BACKGROUND OF THE INVENTION

It is known in manufacturing that components may be stored before the component's incorporation into a finished product. In tire manufacturing, there is a necessity to store longitudinal components at various stages of the manufacturing process.

Typically, such components are stored in an A-frame carriage with a central roll. Such carriages permit a large capacity storage of a longitudinal component, but have drawbacks. The carriages have to be changed out when the carriage is full. During storage, the portion of the component closest to the central roll is subject to the pressure exerted by the remainder of the component wound onto the roll; this can create uneven deformation of the component. Because the component is wound onto a roll, wherein the diameter of the roll increases as more of the component is placed on the carriage, the rotation speed of the carriage must be monitored to ensure correct tension on the stored component, and for any liner also being applied, the tension of the liner must also be monitored.

U.S. Pat. No. 5,494,205 discloses an apparatus for festooning a traveling length of web-like material. The apparatus is a moveable carriage comprising a plurality of support rods extending between the longitudinal sides of the carriage. The material is draped over the rods. As the rods travel the length of the carriage, the material is carried through the carriage. The material hangs freely down from the rods. While this is an acceptable storage method for textile fabrics, as disclosed in U.S. Pat. No. 5,494,205, such a carriage would not be suitable for elastomeric, or elastomeric coated, sheets as the unsupported weight of the elastomer, as it hung in such a storage apparatus, would distort and pull the sheet. Such an occurrence would be detrimental to producing a quality product from the elastomeric sheet; any distortion effect being made worse if the elastomeric sheet is reinforced by any type of cording or fiber reinforcement.

SUMMARY OF THE INVENTION

The present invention is directed towards a storage carriage for longitudinal components. The storage carriage is comprised of a pair of continuous belts. The belts are arranged to form a nested zigzag pattern. As the material is feed through the nested zigzag pattern, substantially the entire length of the component within the storage carriage is subjected to the same tension and compression.

The longitudinal component is fed into the carriage at one corner of the carriage and is removed from the opposing corner of the carriage. The component travels through the carriage in a "first-in/first-out" system; making removal of the component from the carriage easier than in conventional storage methods.

In one aspect of the invention, the carriage has a plurality of connected drive rolls that drive the pair of continuous belts.

In another aspect of the invention, the carriage is comprised of alternating series of drive rolls and guide rolls.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
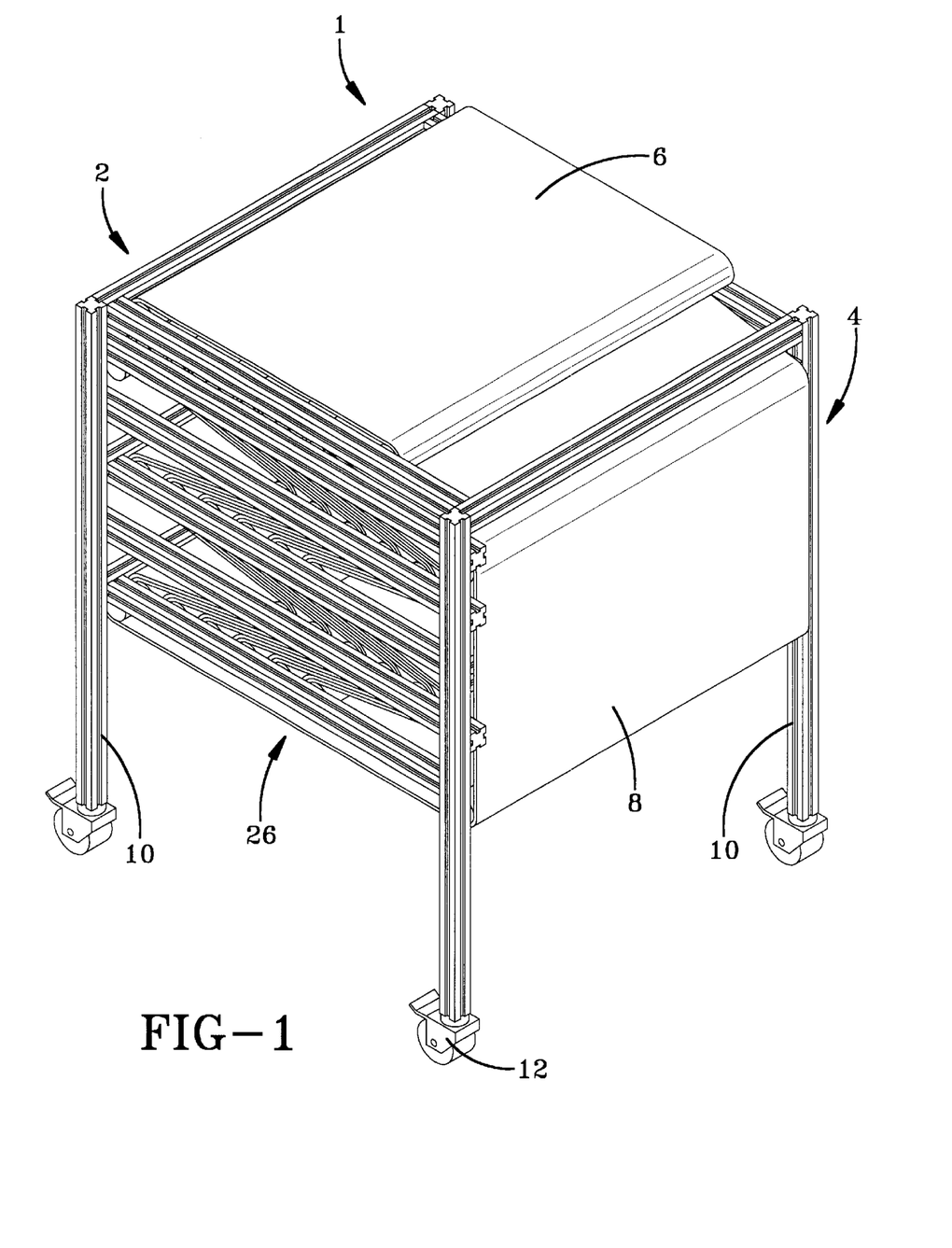
FIG. 1 illustrates the inventive storage carriage.

FIG. 1 illustrates the storage carriage 1 of the present invention. The storage carriage 1 functions by a longitudinal component being fed into one side 2 of the carriage 1, and being removed from the other side 4 of the carriage 1. While in the carriage 1, the component is held, at low tension, between a pair of endless belts 6, 8, and is fed along a primarily vertical zigzag storage path. The entire length of the material is subjected to the same tension and deformation since each discrete point along the length of the material must travel the same path as the material travels through the carriage 1.

The longitudinal component that may be stored in the carriage 1 may be any type of continuous or non-continuous material. It may be a woven or non-woven fabric, an elastomeric sheet, a reinforced elastomeric sheet, an elastomeric calendered material, or any similar type of web. The thickness of the component that can be stored in the carriage 1 may vary but will be limited by the space within the carriage 1.

Figure 2:
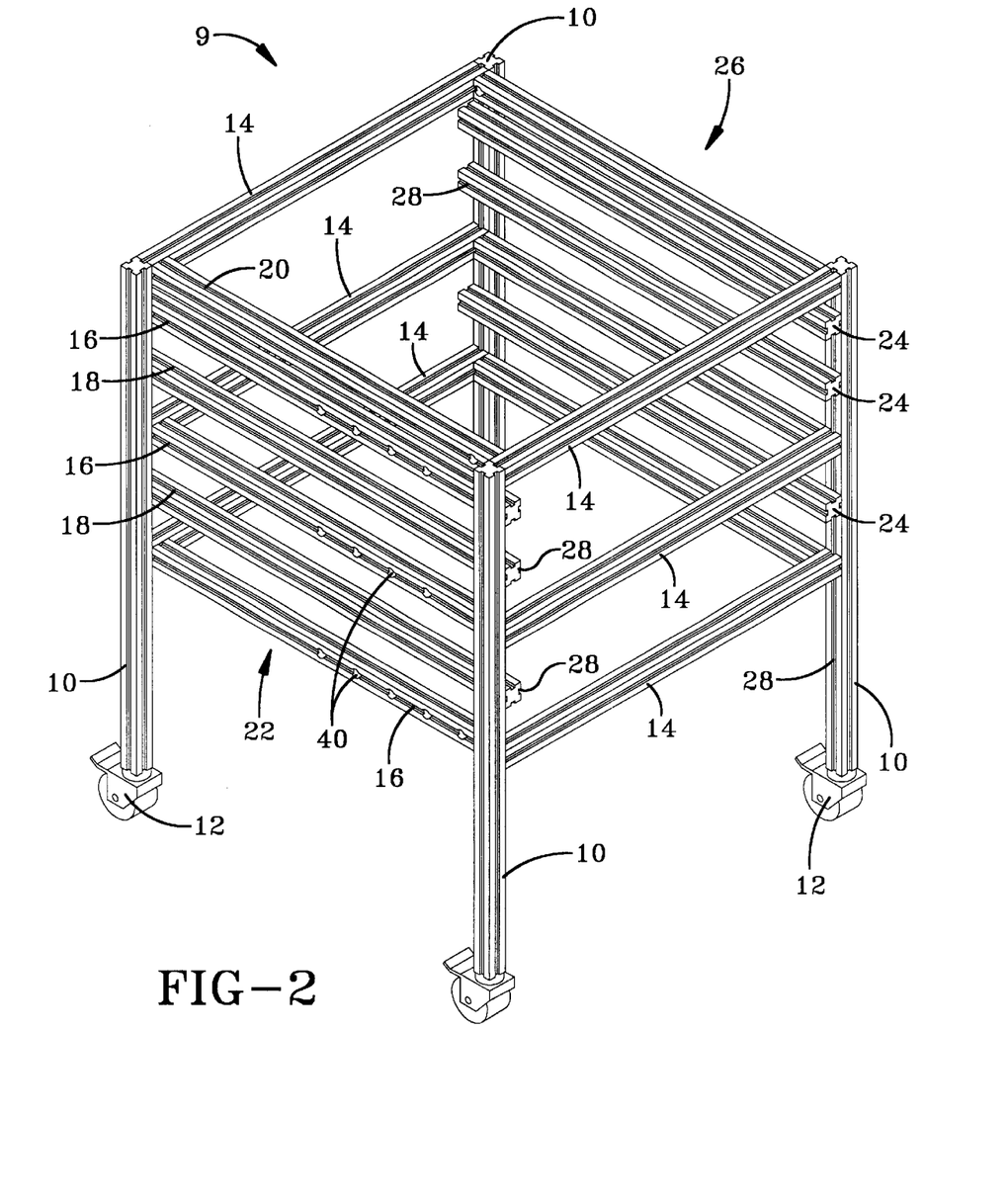
FIG. 2 is the frame of the storage carriage.

The carriage 1 has a frame 9 of four vertical posts 10. The base of each post 10 is preferably provided with a wheel and brake means 12 in order to move the carriage 1 about or fix the location of the carriage 1 in the manufacturing process or storage area. Along each transverse side of the carriage 1 is a plurality of transverse support rods 14. Along one longitudinal side of the carriage 1 are alternating multiple bored drive rails 16 and non-bored rails 18 with an uppermost single bored rail 20. This is the drive side 22 of the carriage 1. Along the opposing longitudinal side of the carriage 1 are a plurality of fixed rails 24; this is the non-drive side 26 of the carriage 1. For mounting of the plurality of rolls of the carriage 1, each post 10 and support rod 16, 18, 20, 24 is provided with channels 28.

Figure 3:
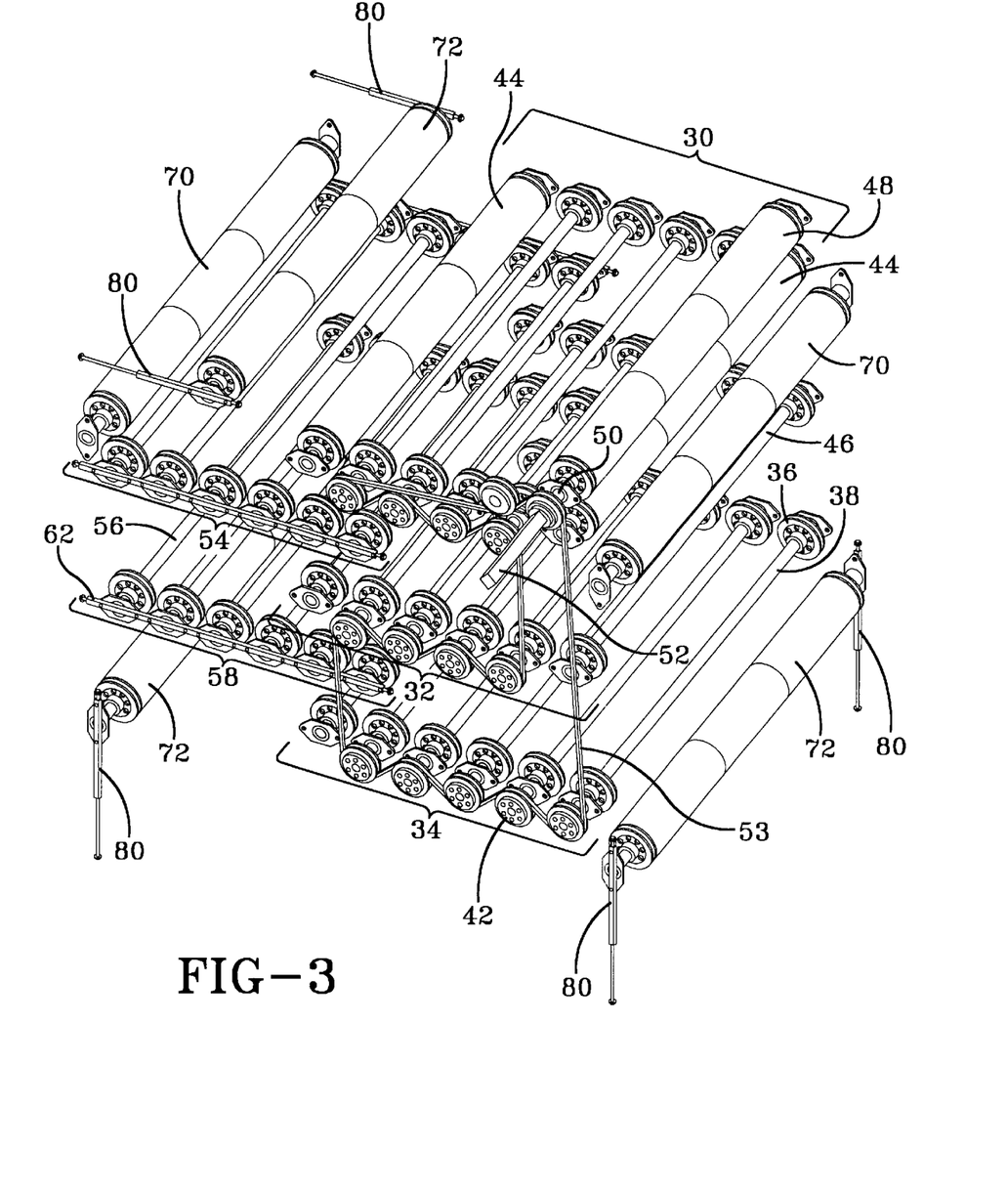
FIG. 3 is the roller arrangement of the carriage, the rollers illustrated outside of frame.

The rolls to be mounted in the carriage frame 9 are illustrated in FIG. 3. The rolls are illustrated in the exact configuration in which they are mounted in the frame 9 illustrated in FIG. 2. To be mounted in each multiple bored rail 16, and the opposing longitudinal rail 24 are series 30, 32, 34 of drive rolls 36. The drive rolls 36 are mounted into the rails 24 on the non-drive side 26 of the carriage 1, and the drive shaft 38 of the drive rolls 36 extends through the bores 40 in the rails 16 on the drive side 22 of the carriage 1. The drive rolls 36 have an illustrated diameter equivalent to the drive shaft 38, but the drive rolls 36 may have a larger diameter if desired.

Figures 5, 6:
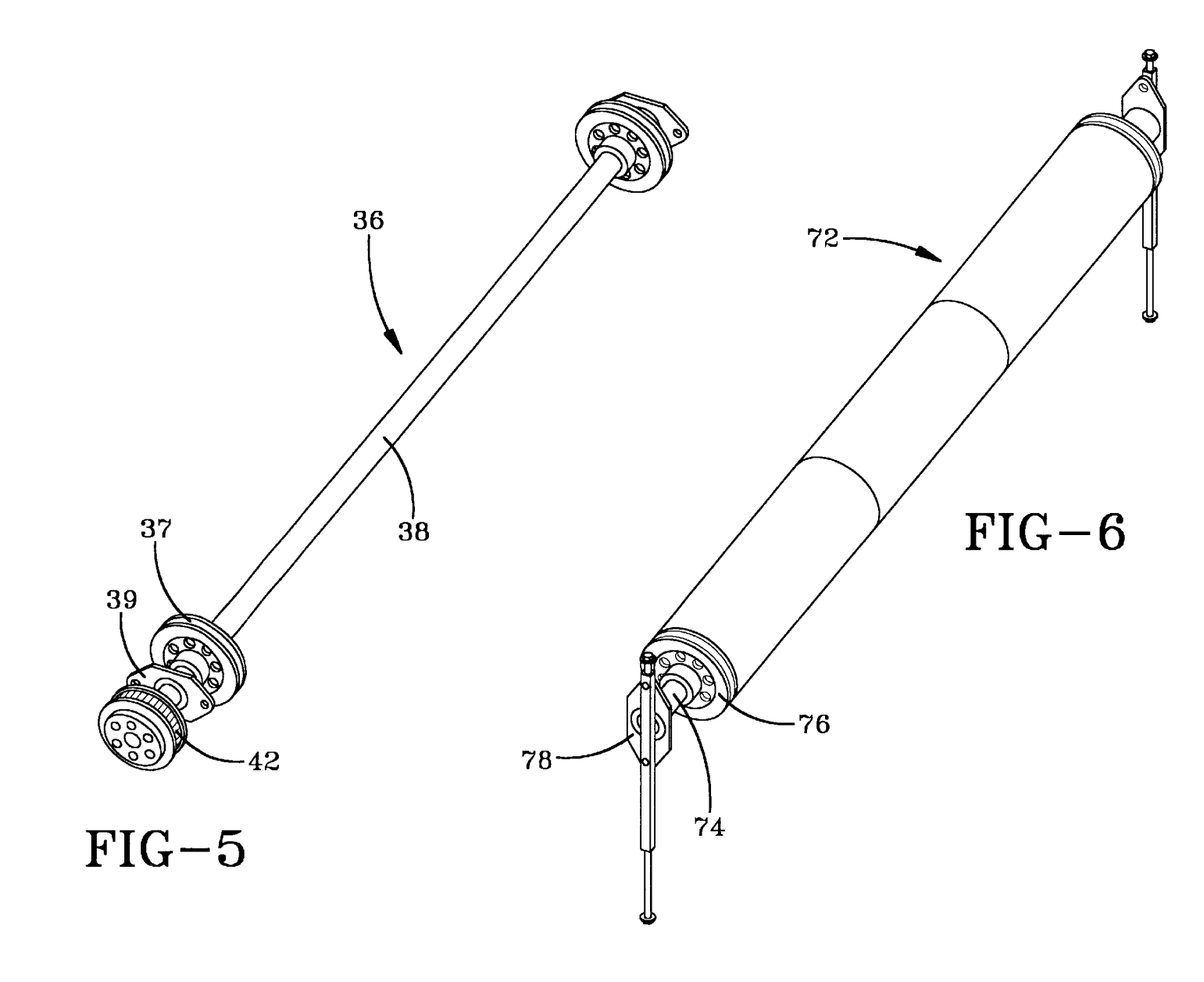
FIG. 5 is a drive roll.
FIG. 6 is a tension roll.

A singular drive roll 36 is shown in FIG. 5. The drive shaft 38 extends between a pair of opposing pulleys 37. Adjacent to each pulley 37 is a bearing flange 39. Adjacent to one of the bearing flanges 39 is a timing belt pulley 42.

In the uppermost series 30 of drive rolls 36 there are four drive rolls 36. At both traverse sides of the series of drive rolls 36 are guide idle rolls 44. The guide idle rolls 44 are illustrated with a larger diameter than the drive rolls 36. In the middle series 32 of drive rolls 36 there are four drive rolls 36 with guide idle rolls 46 on each side of the series 32 of drive rolls 36. In the bottom series 34 of drive rolls 36 there are five drive rolls 36 and a single idle roll 46 located on the inner transverse side of the series 34 of drive rolls 36.

To be mounted in the uppermost longitudinal rail 20, at one traverse end of the rail 20, is a guide drive roll 48. The guide drive roll 48 has a diameter larger than the drive rolls 36, and is preferably equivalent to the guide rolls 44 mounted in the adjacent rail 16. The guide drive roll 48 is mounted into the rail 20 on the non-drive side 26 of the carriage 1. On the drive side 22, the drive shaft 50 extends through the bore 40 in the uppermost rail 20. A belt pulley 42 is mounted onto the drive shaft 50. An extension 52 of the shaft 50 extends further past the pulley 42 in order to engage the drive means (not illustrated) which drives the carriage 1. Similar to the drive roll 36, at each end of the drive shaft 50 of the guide drive roll 48 there is a pulley 37 and a bearing flange 39.

Wrapped about the pulleys 42 of the drive rolls 36 and the guide drive roll 48 is a timing belt 53. The belt 53 is woven about the pulleys 42 of each series 30, 32, 34 of drive rolls 36 and about the guide drive roll 48.

Figure 4:
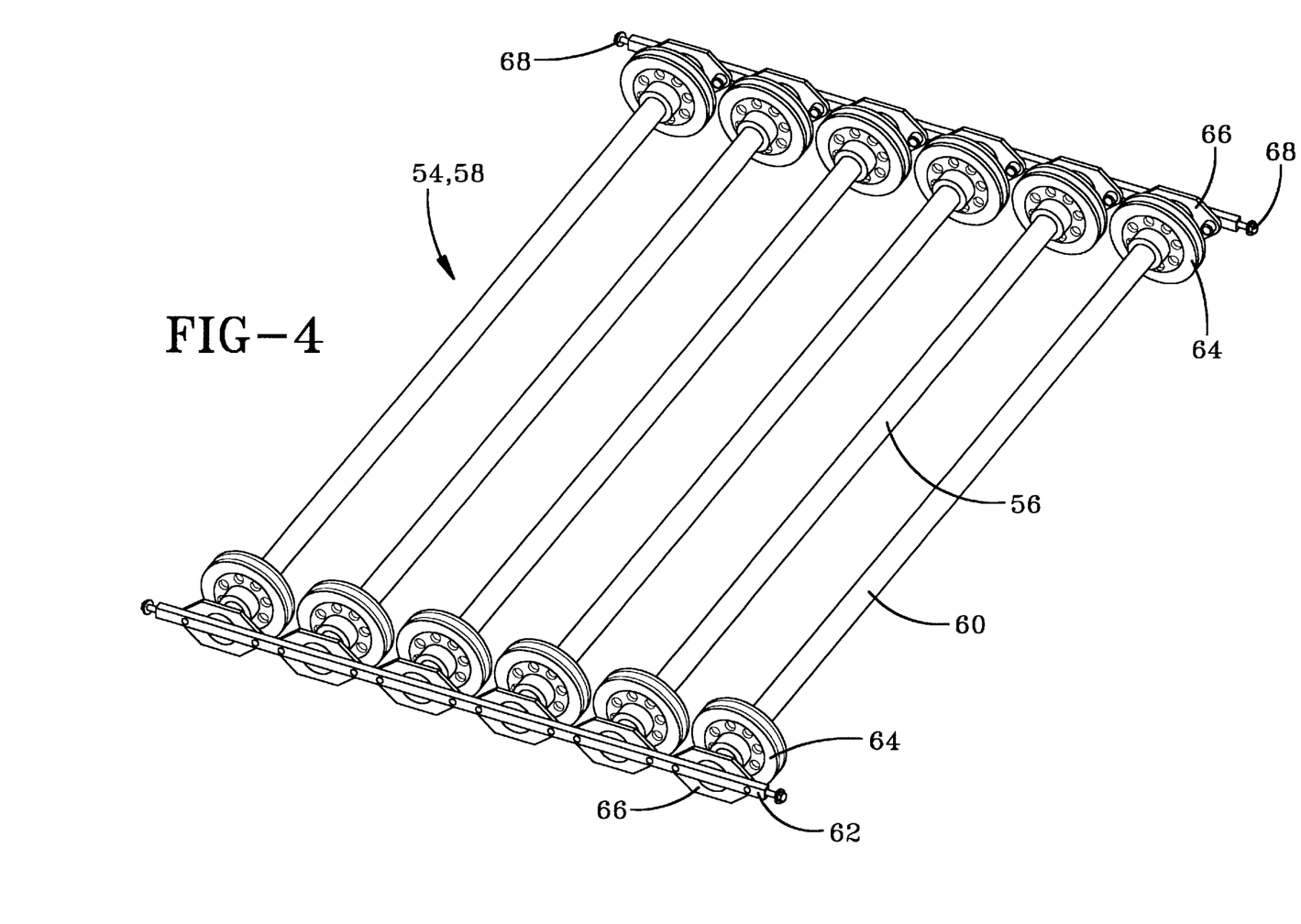
FIG. 4 is a set of joined idle rolls.

Between the top and middle series 30, 32 of drive rolls 36 is a series 54 of guide rolls 56. Between the middle and bottom series 32, 34 of drive rolls 36 is another series 58 of guide rolls 56. Similar to the drive rolls 36, the guide rolls 56 have a preferred diameter equivalent to the drive shaft 60. Each roll 56 in each series 54, 58 of guide rolls 56 is connected to each other by means of a slide bracket 62, see also FIG. 4. Each end of the drive shaft 60 of each roll 56 extends through a v-pulley 64 and terminates in a bearing flange 66 that is secured to the slide bracket 62. Each end of the slide bracket 62 has a spring 68.

Vertically spaced between the top series 30 of drive rolls 36 and the adjacent series 54 of guide rolls 56, and mounted at the transverse ends of the carriage 1 are two belt guide rolls 70. These belt guide rolls 70 have similar construction to the guide idle rolls 44 located at the transverse ends of the top series 30 of guide rolls 36. The rolls 70 are preferably mounted between the vertical posts, see also FIG. 7.

At the remaining three corners of the carriage 1 are tension guide rolls 72; two tension guide rolls 72 are mounted at the bottom of the carriage 1, and the third roll 72 is mounted along the top of the carriage 1, opposite from the guide drive roll 48. The tension guide rolls 72 have the same diameter as the guide idle rolls 44 and the guide drive roll 48. Each end of the shaft 74 of the tension guide rolls 72 extends through a v-pulley 76 and terminates in a bearing flange 78, see also FIG. 6. The bearing flanges 78 are mounted to tension rods 80. The tension rods 80 pass through a channel 28 running along the length of the opposing vertical posts 10. The top tension guide roll 72 has an identical construction; however, the tension rods 80 are mounted within the channels 28 of the uppermost longitudinal rails 20.

All of the rolls 36, 44, 46, 48, 56, 70, 72 within the carriage 1 are freely rotatable about their drive shafts 38, 60, 74, though the ends of the rolls may be fixedly attached to either the longitudinal rails 16, 18, 20, the vertical posts 10, or a slide bracket 62. In the illustrated embodiment, this is achieved by both ends of the drive shaft of each roll 36, 44, 46, 48, 56, 70, 72 being connected to a v-pulley 64 and a bearing flange 66.

Figure 7:
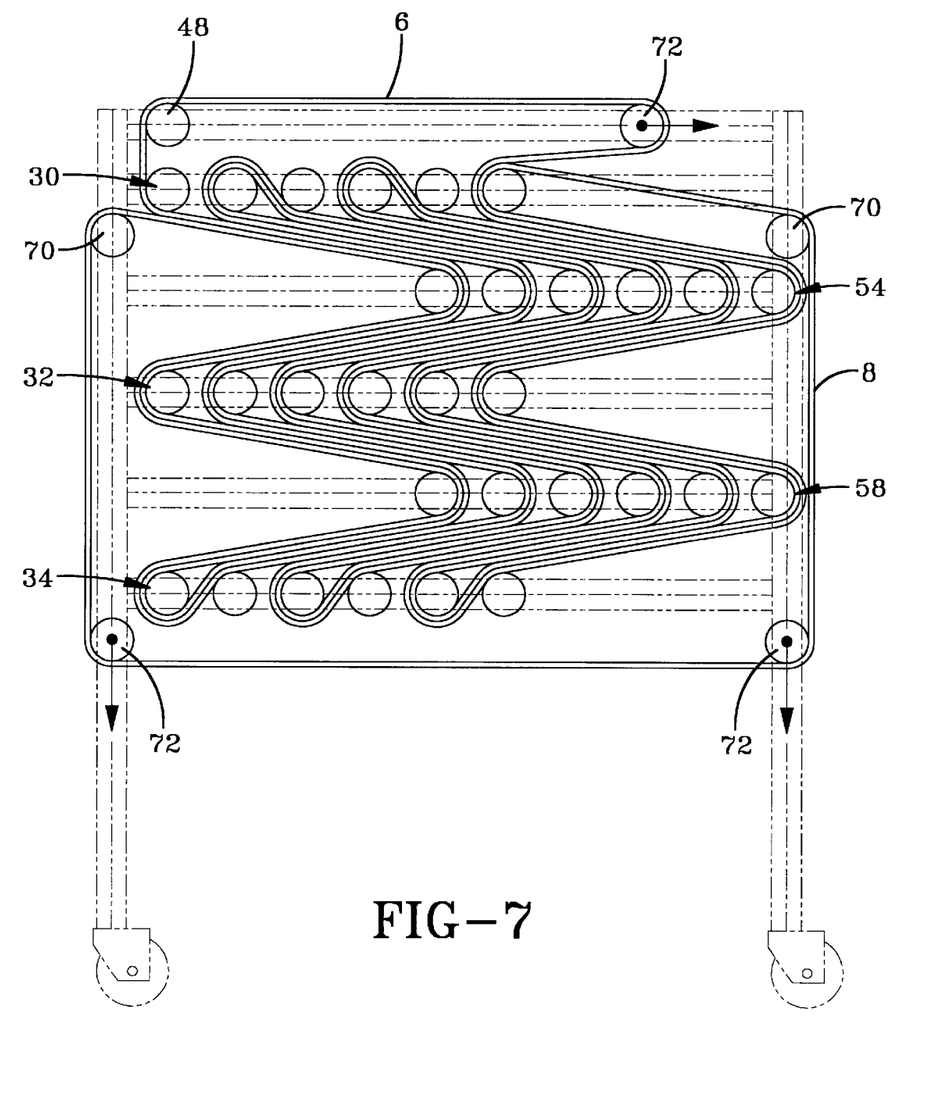
FIG. 7 is the belt arrangement within the carriage.
Figure 8:
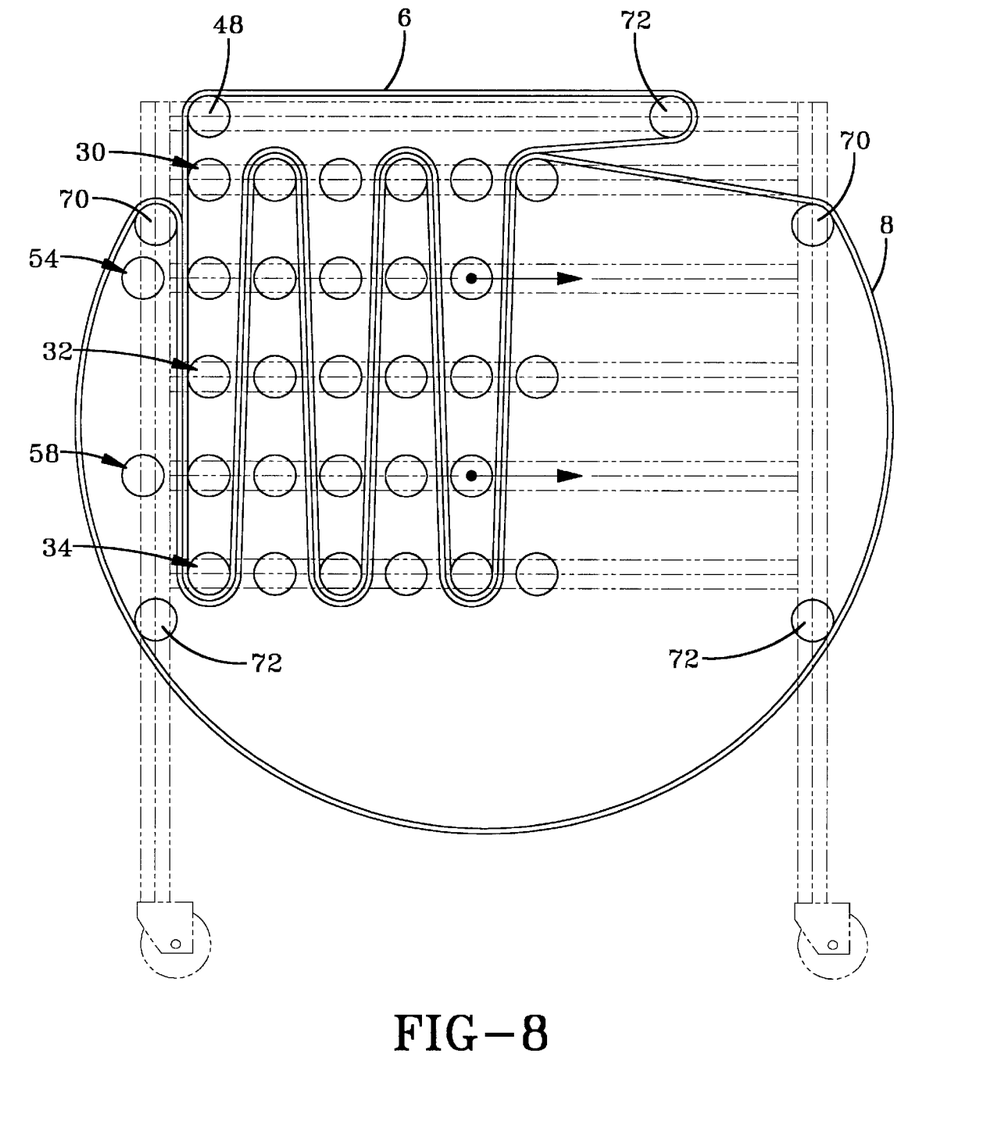
FIG. 8 is the belt and roll arrangement within the carriage after the belts have been feed into the carriage.

When all of the rolls 36, 44, 46, 48, 56, 70, 72 are mounted within the carriage frame, two belts 6, 8 are wound through the carriage 1. To assist the operator in threading the belts 6, 8 through the carriage 1, the tension in the tension guide rolls 72 is released in the direction indicated by the arrows, see FIG. 7. The series 54, 56 of guide rolls 56, mounted in the slide brackets 62, are shifted to the same side of the carriage 1 as the series 30, 32, 34 of drive rolls 36 to a position wherein the guide 56 and drive 36 rolls are vertically aligned, see FIG. 8. FIGS. 7 and 8 illustrate the carriage from the non-drive side 26 of the carriage 1, and for clarity, the rails 16, 18, 20 and posts 10 of the carriage 1 are illustrated in an outline form.

Belt lengths are threaded about the vertically aligned rolls 36, 44, 46, 48, 56, 70, 72. A first belt length is threaded about the top tension guide roll 72 and the guide drive roll 48. A second belt length is threaded about the bottom tension guide rolls 72, and the belt guide rolls 70. After the belt lengths have been threaded through the rolls 36, 44, 46, 48, 56, 70, 72, the ends of the belt lengths are spliced to form the two endless belts 6, 8, and the series 54, 58 of guide rolls 56 are shifted back to the operating position of being horizontally offset from the series 30, 32, 34 of drive rolls 36 as shown by the directional arrows, see FIG. 8. After the series 54, 58 of guide rolls 56 are shifted back to the operating position, the belts are supported by the pulleys 64 located at the ends of the rolls 36, 44, 46, 48, 56, 70, 72.

To operate the storage carriage 1, and to feed a longitudinal component into or out of the carriage 1, a motor drives the guide drive roll 48, which in turn, by means of the timing belt 53, drives the three series 30, 32, 34 of drive rolls 36. The guide rolls 56 rotate at the same speed as the drive rolls 36 due to the contact of the belts 6, 8 with the drive rolls 36 and the guide rolls 56. Each series 30, 32, 34, 54, 58 of drive and guide rolls may be further synchronized by using a v-belt threaded about the v-belt pulleys 64 at the ends of the drive shafts 38, 50, 60 of the rolls. The belt guide rolls 70 may be further synchronized with the lower tension guide rolls 72 by means of a v-belt wound about the v-pulleys at the ends of the drive shafts 74 of the rolls 70, 72.

Figure 9:
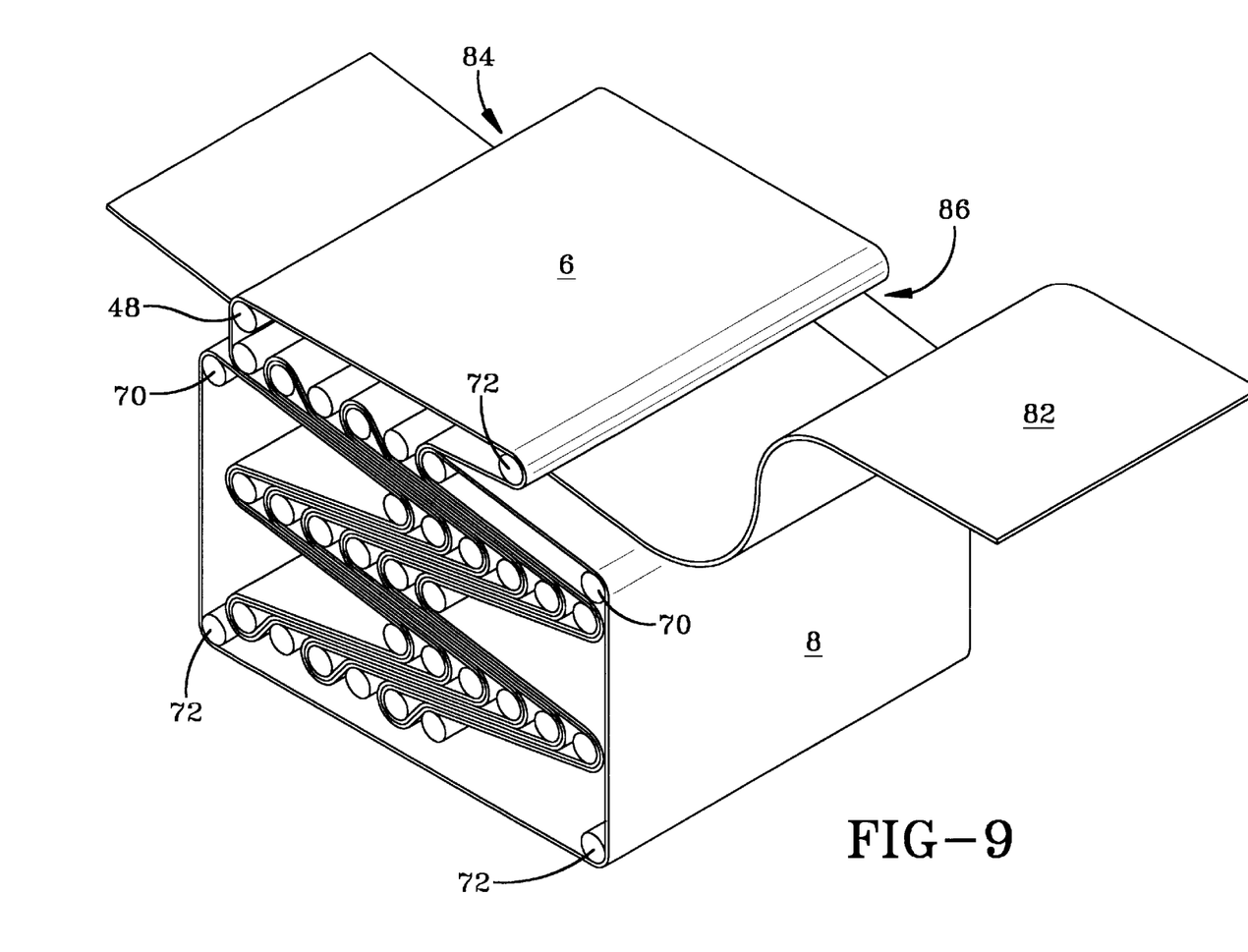
FIG. 9 illustrates a longitudinal component as it is feed through the carriage.

The operating path of the belts 6, 8 can best be described as a nested zigzag pattern, see FIGS. 7 and 9; that is, the belts are arranged in a path so that the belts fit close together following a zigzag pattern. The longitudinal component 82 is feed into the carriage 1 at an upper corner 84 of the carriage 1, and positioned between the two belts 6, 8. The component 82, as it is fed through the carriage 1, travels through the nested zigzag pattern. Once the component 82 is fed into the carriage 1, the component 82 is self-threading through the carriage 1. Because the belts 6, 8, and the component 82 between the belts 6, 8, is supported by the rolls 36, 44, 46, 56 the component 82 is not subjected to a increasing pressure caused by more of the component 82 being added to the carriage 1; instead substantially the entire length of the component 82 within the storage carriage 1 is subjected to the same tension and compression. The longitudinal component 82 is removed from the opposing upper corner 86 of the carriage 1.

When the carriage 1 is used to storage a longitudinal component, similar to a conventional storage means, the component 82 is feed into the carriage 1 until the carriage 1 reaches its capacity. However, unlike conventional storage means, removal of the component 82 from the carriage 1 is much simpler. The component 82 is removed from the corner 86 of the carriage 1 on a first-in, first-out basis.

Also, because the carriage 1 can also be described as an-line storage unit, the carriage 1 can be placed in-line with production as an intermediate storage between the longitudinal component forming apparatus and the apparatus which uses the formed longitudinal component 82. This may be desired if the longitudinal component forming apparatus produces the longitudinal component 82 faster than the longitudinal component 82 is being used in forming a final or intermediate article.

Figure 10:
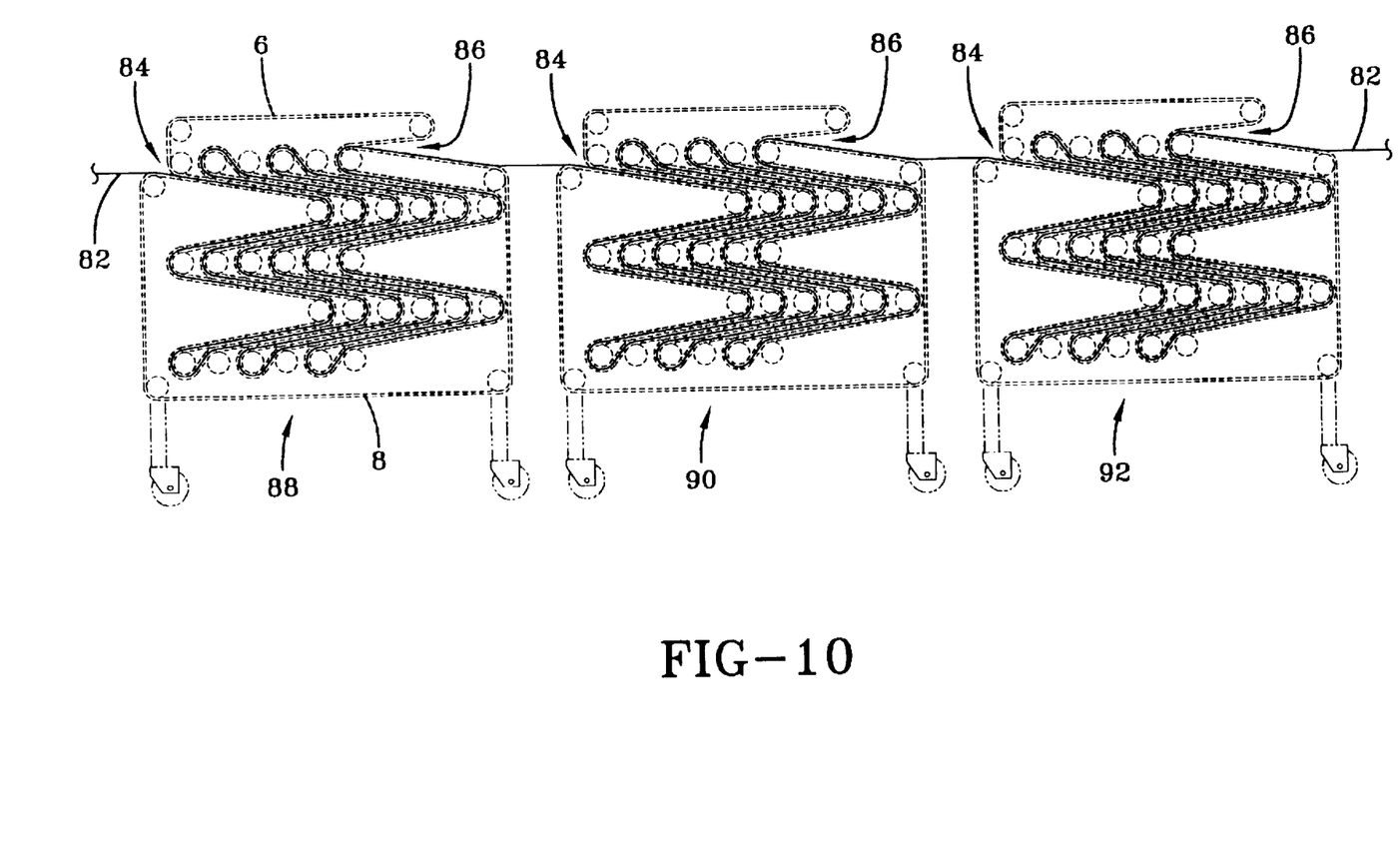
FIG. 10 is a train of carriages for storage of a continuous longitudinal component.

Another method of use of the storage carriage 1 is to chain multiple storage carriages 1 together, see FIG. 10. Motors of adjacent carriages 88, 90, 92 are synchronized, and, as the longitudinal component 82 exits the first carriage 88, it is fed into the second carriage 90, and then into a third carriage 92 as desired.

Each illustration of the carriage shows each horizontal row of rolls 36, 44, 46, 56 as having a total of six rolls. However, the number of both drive rolls 36 and guide rolls 56 may be increased in each series 30, 32, 34, 54, 58 in order to increase the storage capacity of the carriage 1. The requirement that must be met is that the total number of rolls 36, 44, 46, 56 in each horizontal row of rolls must be the same.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A storage carriage for storing a longitudinal component, the carriage being characterized by:

a pair of continuous belts, and the belts being arranged to create a storage path between the pair of belts, wherein the storage path is comprised of multiple zigzag paths that are nested within one another, resulting in a nested zigzag storage path within the storage carriage.

2. A storage carriage as set forth in claim 1 wherein the carriage is further characterized by a plurality of connected drive rolls to drive the pair of continuous belts.

3. A storage carriage as set forth in claim 1 wherein the carriage is further characterized by alternating series of drive rolls and guide rolls.

4. A storage carriage as set forth in claim 1 wherein the carriage is further characterized by having an inlet corner located at one corner of the carriage and an outlet corner located at an opposing corner of the carriage.

5. A storage carriage as set forth in claim 1 wherein the carriage is further characterized by at least one series of guide rolls, the rolls in the at least one series being connected to each other.

6. A storage carriage as set forth in claim 5 wherein the carriage is further characterized by the at least one series of guide rolls being horizontally moveable within the carriage.

7. A method of storing a longitudinal component, the method comprising feeding the component into a storage carriage and along a storage path, the method being characterized by:

feeding the component along a nested zigzag storage path wherein the component is feed through multiple zigzag paths that are nested together.

8. A method of storing a longitudinal component in accordance with claim 7, the method being further characterized by feeding the component between a pair of continuous belts.

9. A method of storing a longitudinal component in accordance with claim 7, the method being further characterized by feeding the component into another storage carriage after the component exits the storage carriage.

10. A method of storing a longitudinal component in accordance with claim 7, the method being further characterized by subjecting substantially the entire length of the component within the storage carriage to the same tension and compression.

\* \* \* \* \*